UNITED STATES PATENT OFFICE.

FRANK H. WAGEMANN, OF DES MOINES, IOWA.

PROCESS OF PRODUCING A PALE CHILL-PROOF BEER.

949,011.   Specification of Letters Patent.   Patented Feb. 15, 1910.

No Drawing.   Application filed November 13, 1909. Serial No. 527,965.

*To all whom it may concern:*

Be it known that I, FRANK H. WAGEMANN, a citizen of the United States, residing in Des Moines, county of Polk, and State of Iowa, have invented a new and useful Improvement in Processes for Producing a Pale Chill-Proof Beer, of which the following is a specification.

My invention relates to a process for producing a pale, golden colored, chill proof, beer.

In this process the mash method (inversion of malt and malt adjuncts) generally used in the production of beer, may be applied and the drawing of wort (extract from malt and malt adjuncts) completed by running the same from the wort strainer into the brew kettle.

The total quantity of wort necessary for a brew is produced from a first and a second wort. The first wort is brought to boiling and boiled until a thorough coagulation of albumen, indicated by a flaked appearance, is noticeable. Two and one-half per cent.
or more, of the entire quantity of hops to be given the brew is then added and boiled with the first wort for a period of ten minutes, or longer if desired. This first wort, together with the added hops, is then delivered to a vessel, called a hop strainer, and left there to settle until its temperature has receded to approximately one hundred and ninety degrees Fahrenheit. The wort is then filtered through the aforesaid hops and also, if desired, through a specially constructed filter inlaid with fresh hops, and therefrom delivered to the coolers and thence to the fermenter. The second wort is brought to boiling and boiled until a thorough coagulation of albumen, indicated by a flaked appearance, is noticeable. Two and one-half per cent. or more, of the entire quantity of hops to be given the brew is then added and boiled with the second wort for a period of ten minutes, or longer if desired. This second wort, together with the added hops, is then delivered to the hop strainer and left there to settle until its temperature has receded to approximately one hundred and ninety degrees Fahrenheit. This wort is then filtered through its percentage of hops, added as aforesaid, and also, if desired, through a specially constructed filter inlaid with fresh hops, and therefrom delivered back to the brew kettle, mechanically or by gravity. After this second wort, settled and filtered, is back in the brew kettle it is boiled with the remaining quantity of hops, the same being added at intervals. When the desired concentration of extract, in this second wort, is attained, by evaporation, it is cooled and delivered to the fermenters in the ordinary manner, where it is united with the first wort. From this point the ordinary process in the manufacture is employed.

By this process, the settling and filtering of the worts in their respective percentages of hops, large quantities of albumen are separated and removed and as this occurs to the second wort prior to its boiling, for evaporation, with the principal quantity of hops, it is obvious that the albumen separated and removed therefrom is prevented from going back into solution. The albumen being removed, in the manner above described, the beer made from the combined worts may be submitted to any low temperature, necessary for general use, without showing albumen turbidity. The first wort being delivered to the fermenters, in which the yeast is awaiting it, will give the yeast a vigorous start to ferment before the second wort, which is light in extract and poor in nourishment, is united with the first, thus giving the yeast used strength against contamination by bacteria.

The theory of this process for producing a pale beer is based upon the fact that the first wort, being the heavy extract of the entire brew, is not given a chance to caramelize within its ten minutes of boiling and, in the second place, the first wort is not subjected to the chemical action which the principal amount of hops has thereon. The ordinary subsequent treatment of the two worts, united in the fermenters as hereinbefore described, will produce a pale, golden colored and chill proof beer.

Having thus described my process what I claim and desire to secure by Letters Patent of the United States, is—

1. The process of producing a chill proof beer consisting of boiling the wort with a small percentage of hops and settling and filtering the same and removing large quantities of albumen therefrom before the wort is boiled for concentration, with the principal quantity of hops, substantially as described herein.

2. The process of producing a pale, chill proof, beer consisting of dividing the wort and boiling the first wort with a small percentage of hops, settling and filtering the same and delivering the filtered wort to the fermenter; boiling the second wort with a small percentage of hops and settling and filtering the same, delivering the filtered wort to the brew kettle where it is boiled with the principal quantity of hops, delivering the wort and hops to the hop strainer, filtering the same and delivering the wort to the fermenter where it is united with the first wort, substantially as described herein.

3. The process of producing a pale, chill proof, beer consisting of dividing the wort and boiling the first wort with a small percentage of hops, settling and filtering the same, running the wort through a second filter inlaid with fresh hops and delivering the wort to the fermenter; boiling the second wort with a small percentage of hops, settling and filtering the same, running the wort through a second filter inlaid with fresh hops, boiling the wort with the principal quantity of hops, cooling and filtering the same and delivering the wort to the fermenter where it is united with the first wort, substantially as described herein.

FRANK H. WAGEMANN.

Witnesses:
ELIZABETH O. ROE,
ZELL G. ROE.